United States Patent [19]

Hoffman

[11] Patent Number: 4,553,990
[45] Date of Patent: Nov. 19, 1985

[54] DEVICE FOR SEPARATING GASEOUS AND LIQUID COMPONENTS FROM A FOAMY GAS LIQUID MIXTURE

[75] Inventor: Albert Hoffman, Wolfratshausen, Fed. Rep. of Germany

[73] Assignee: Linde Aktiengesellschaft, Hollriegelskreuth, Fed. Rep. of Germany

[21] Appl. No.: 608,963

[22] Filed: May 10, 1984

[30] Foreign Application Priority Data

May 11, 1983 [DE] Fed. Rep. of Germany ....... 3317260

[51] Int. Cl.⁴ .............................................. B01D 19/02
[52] U.S. Cl. ....................................... 55/178; 55/204; 435/316
[58] Field of Search ..................... 55/52, 87, 178, 204; 252/361; 435/812, 313–316

[56] References Cited

U.S. PATENT DOCUMENTS

| | | | |
|---|---|---|---|
| 2,037,426 | 4/1936 | McKeever | 55/204 |
| 2,564,765 | 8/1951 | Mercier | 55/178 |
| 2,765,867 | 10/1956 | Revallier et al. | 55/178 |
| 2,913,068 | 11/1959 | Mistarz et al. | 55/204 |
| 3,520,822 | 7/1970 | Traelnes | 55/178 X |
| 3,738,488 | 6/1973 | Hondermark | 435/316 X |
| 4,203,961 | 5/1980 | Cowley | 55/204 X |

*Primary Examiner*—Charles Hart
*Attorney, Agent, or Firm*—James C. Wray

[57] ABSTRACT

The invention relates to a device for separating gaseous and liquid components of a foamy gas liquid mixture, into which device a feed line for the gas liquid mixture and a withdrawal line terminate, and into whose top portion there is arranged a turbine. In order to obtain a complete and quick separation of the gas and liquid components of the foamy gas liquid mixture, it is suggested that the container part, below the turbine is a centrifugal separator into which the feed line terminates as a tangential inlet (FIG. 1).

7 Claims, 2 Drawing Figures

DEVICE FOR SEPARATING GASEOUS AND LIQUID COMPONENTS FROM A FOAMY GAS LIQUID MIXTURE

The invention relates to a device for separating gaseous and liquid components from a foamy gas liquid mixture in a container, into which a feed line for the gas liquid mixture and withdrawal lines terminate, and whose top portion houses a turbine.

In numerous processes of the chemical industry, liquids are brought into contact with gas, or a reaction gas is produced during the process, respectively. In either case, foaming of liquids may result. As a rule, the removal from the liquid of excess gas, reaction gas and foam which might have formed, is necessary.

The problem of separating gaseous components from a liquid, or, respectively, separation of a foamy liquid gas mixture into its gaseous and liquid components is encountered in aerobic fermentation processes. In such processes, the oxygen required for the growth of microorganisms is added to the fermentation liquid in the form of oxygen-enriched gas.

The microorganisms consume part of the oxygen so that the excess gas and the carbon dioxide formed as the metabolic product, in the fermentation liquid cause the formation of foam. However, foam formation is undesirable, because, in addition to other reasons, a considerable portion of the fermenter volume is taken up by the formed foam, and thus is lost to the actual fermentation process.

It is known in the art to remove excess gas and reaction gas from a foamy liquid by passing the liquid to a container outside the reaction chamber, in which gas and liquid, due to their differing densities separate under the influence of gravitational force, and the liquid, freed of gas and foam, is returned to the reaction chamber. It is further known to arrange a turbine in the top portion of such a container, which destroys the foam. Both of these variations, however, have the disadvantage that the increased circulating speed requires an ever increasing volume to be available for lowering the flow velocity. In fermentation processes, however, it is of utmost importance that the microorganisms are provided with constant conditions during the entire growth phase, particularly with regard to a steady supply of oxygen and nutrient substances, to yield optimum growth. Thus, the longer the microorganisms stay in a container outside the fermenter, the less favorable the growth conditions become.

Accordingly, it is the objective of the invention to offer a device of the kind initially described, in which a complete and rapid separation of the gas and liquid components of a foamy gas liquid mixture can be obtained.

The process of the invention achieves this objective in that the container portion below the turbine is a centrifugal separator into which the feed line terminates as a tangential inlet.

According to the invention, the foamy gas liquid mixture is initially passed tangentially into a centrifugal separator and is placed into circular flow. Thereby the gas bubbles distributed throughout the liquid are separated from the liquid in the form of foam. It has been found that the increased separating effect in the centrifugal field causes rapid separation of the gas liquid mixture into a liquid portion, which is almost entirely gas free, and a foam portion. The gas free liquid is withdrawn at the lower end of the centrifugal separator, or the container, respectively.

The foam, separated from the liquid, collects with an axially shaped cone formed by the circulating liquid flow, and with increasing foam formation, rises up to the top portion of the container. Accordingly, the device of the invention provides that, in a first step, gas is separated from the gas liquid mixture, and in a second step, the foam is decomposed by a mechanical foam breaker into its gas and liquid components. The gas can be withdrawn while the liquid is settling to that part of the container which is designated as the centrifugal separator, where it is withdrawn from the container together with the liquid which has been freed of gases. The inventive device accordingly permits an immediate destruction of the foam and the return of the separated liquid moving in a circular process direction. An essential feature of the invention is the combination of a centrifugal separator with a foam turbine. This arrangement permits control of a foamy, gas laden mixture, as is, for instance, incurred in fermentation processes, in a container with minimum volume.

Apart from the considerably greater separating action exercised by centrifugal force, as compared to gravitational force, the inventive device provides the advantage that the radial height of rise of the gas bubbles is small. The maximum height of rise corresponds approximately to the density of the layer of liquid which adheres to the inner container wall after exiting from the feed line. The density of the liquid layer, in turn, is determined by the width of the feed line orifice. A small radial height of rise causes a rapid degassing and, accordingly, promotes a high flow rate.

Conventional gravitational force separators present the danger of bubble formation during the flow-in of the gas liquid mixture into the separator, i.e. additional foam formation is enhanced, while the inventive device eliminates such danger. Surprisingly, it was determined that the loading capacity of the inventive device, i.e. the range in which the throughput can vary, without reducing the separation effect, is very high.

On the other hand, it is possible to stabilize the flow rate or the circulation amount in a circulatory system in a simple manner by a level control in the centrifugal separator.

In order to obtain complete separation of the gas liquid mixture into liquid and foam, and the destruction of the entire foam amount, it has proven to be highly effective to limit the area of the container in which the gas fluid mixture, or the liquid, respectively, is circularly flowing to that part thereof which is below the turbine.

Accordingly, in another feature of the invention, a ring shaped collar is arranged along the inner wall of the container, extending into the inner portion of the container, below the turbine and above the orifice of the feed line. The collar fastened to the container wall, at its inner circumference, ensures that the incoming gas liquid mixture flows only below the level defined by the collar. It has proven to be particularly beneficial if the gas liquid mixture does not rise above the level defined by the orifice of the feed line. For this reason, the collar is secured immediately above the orifice in an essentially horizontal manner.

As the intensity of the layer of liquid flowing alongside the container inner wall is determined by the width of the feed line orifice, it is of advantage if, according to a further variation of the invention, the collar is at least as wide as the orifice, and preferably approximately twice the width of the orifice. Width here is to be understood as follows: the inner wall of a centrifugal separator, as a rule, is actually symmetrically designed. Width, therefore, means the radial extension of the collar, or the orifice, respectively, as applied to the essentially vertically oriented symmetrical axis.

As described, the foam collecting within the liquid cone rises to the top portion of the container, and subsequently reaches the area of the turbine designed to destroy the foam. In order to avoid the rotating of the foam with the turbine, and inherently a considerable reduction in the breaking-up effect, it has proven to be advantageous, according to another feature of the invention, if the rotational axis of the turbine is essentially vertical, and if in the area above the orifice, there is a wiper, and preferably, a minimum of two wipers at the container inner wall, whereby the wipers extend into the container inner chamber in the directon of the rotational axis of the turbine, and essentially extend parallel to the rotational axis. This simple means prevents rotating of the foam.

In order to prevent foam from reaching the liquid exiting from the inventive device, while ensuring a container volume which as low as possible, it has proven beneficial in a specific variation of the invention to observe certain limits concerning the ratio of container height to diameter. If the container is cylindrically shaped, the ratio of cylinder height to cylinder diameter should range between 3:1 and 6:1.

Another feature of the invention provides that the rotational movement of the degassed liquid is decelerated. To this end, a drag brake is arranged in the area of the container outlet for the liquid portion.

A functionally uncomplicated drag brake is one having baffle plates which intersect in cross section cruciformly or radially.

A particularly effective separation is obtained with the inventive device when, in another variation of the invention, the feed line terminates into the container in such a way that the rotational directions of either the gas liquid mixture or the liquid, respectively, are the same as that of the turbine.

In another preferred variation of the invention, the orifice of the feed line is of a rectangular shape. The cross sectional shape of the gas liquid mixture stream, entering into the inventive device is, therefore, also rectangular so that the density of the flow adhering to the container inner wall, immediately after exiting from the orifice, is identical throughout and consequently a particularly uniform flow is obtained.

It is beneficial if the container outlet for the liquid portion is of cylindrical, or initially cylindrical, and subsequently, conical configuration.

The device of the invention is successfully applied within the scope of a fermentation process. In this connection the gas liquid mixture is withdrawn from the fermenter and passed into the device of the invention. The separated liquid is returned to the fermenter. Due to the small volume of the inventive device, the stay time of the fermentation liquid in the gas free portion of the fermentation cycle is short, so that microorganisms are exposed to optimum growth conditions.

By way of schematic drawings, the following depicts an example of the inventive device for the elimination of foam.

Figure 1:
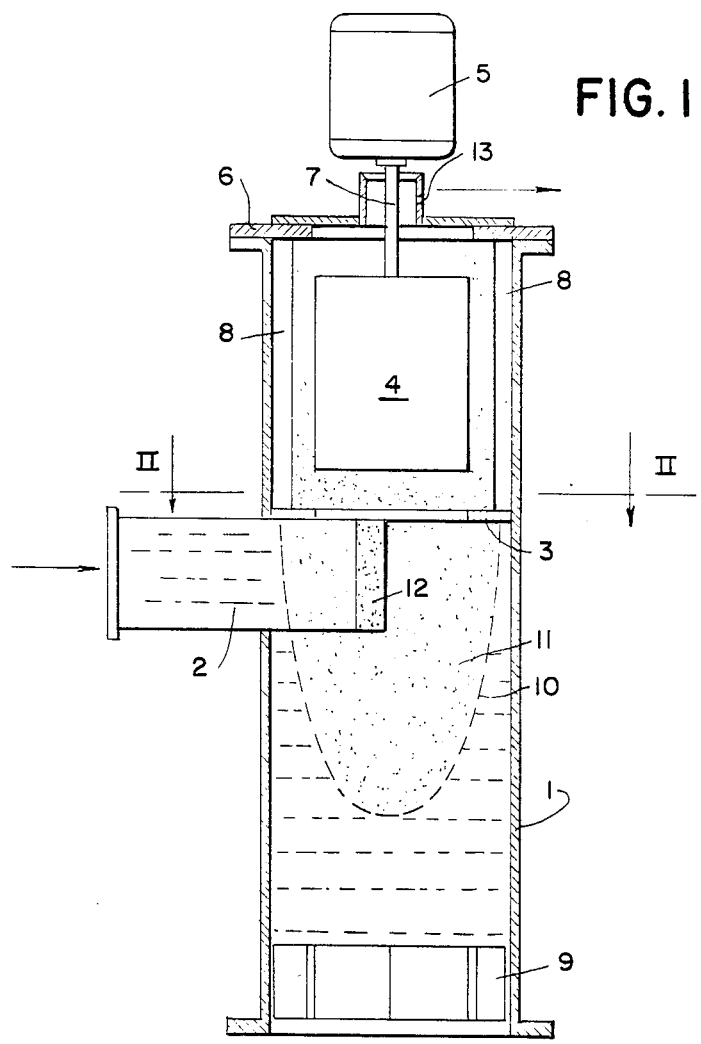
FIG. 1 shows a longitudinal section.
Figure 2:
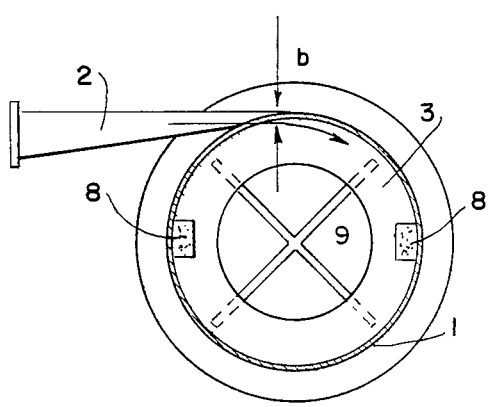
FIG. 2 shows a cross sectional view of the inventive device.

Feed line 2 terminates tangentially into the upper portion of cylinder housing 1. There is collar 3, at the inside of the cylinder, along the circumference, directly above orifice opening 12 of feed line 2. Collar 3 divides the cylinder into two chambers, with different functions.

Separation of the liquid from the foam is effected in the lower chamber. In the upper chamber, the foam is destroyed and separated into its components of gas and liquid. The upper chamber houses foam turbine 4. Foam turbine 4 is driven by motor 5 which is supported at the outside of housing 1 via shaft 7 extending through housing top 6. The rotational axis of the foam turbine is vertically oriented. The example depicts two wipers 8, parallelly disposed to the axis of the foam turbine and arranged at the inner cylinder, in the upper chamber in the vicinity of turbine 4.

Drag brake 9 is arranged at the lower end of the lower chamber. This brake consists of plates cruciformly disposed towards each other in cross section and has the function of decelerating the rotational movement of the liquid in the lower chamber, before its exit from the cylinder.

In the example, the foam produced in a fermentation process, as well as excess gas or reaction gas, respectively, are to be separated from the liquid and the foam destroyed. For this purpose, the foaming gas liquid mixture is withdrawn from the fermenter and introduced into the device of the invention. The device has the following dimensions, for example:

Length of cylinder: 900 mm
Diameter of cylinder: 180 mm
Width b of feed line 2: 10 mm The gas liquid mixture is pumped into the cylinder at a speed resulting in centrifugal acceleration of 400 m/sec$^2$, for instance. Aided by the tangential feed line, the gas liquid mixture lies against the inner surface of the cylinder immediately upon entering the cylinder. The velocity is selected so that the incoming gas liquid mixture stream drops below the level of the feed line orifice after one rotation, due to gravitational acceleration. Collar 3 prevents penetration of the gas liquid mixture into the chamber above this collar. For this purpose, the collar has a width which is twice that of the stream inlet port, i.e., 2 cm. Accordingly, the gas liquid mixture now moves exclusively in the lower chamber in the direction towards drag brake 9. Induced by centrifugal force, the gas liquid mixture is quickly separated into the liquid and foam, whereby foam 11 collects in axially shaped cone 10. With increasing foam quantity, foam 11 moves into the upper chamber. Foam turbine 4 arranged in the upper chamber decomposes the foam. Two wipers prevent the foam from being rotated by the foam turbine which would result in a reduction of the decomposition effect. Gas formed during the decomposition leaves the cylinder via gas exhaust 13 terminating into housing top 6, while separated liquids flow to the lower chamber. Before leaving the cylinder, the liquid is extensively freed of undissolved gases. Drag brake 9, consisting of two baffle plates, decelerates the rotating liquid. The liquid is subsequently withdrawn from the inventive device. The exit side of this device may be cylindrical or cylindrical/conical. A particular advantage of the inventive device is that all parts can be wetted, so that there is no adhesion of fermentation matter to the inner surface.

I claim:

1. Device for separating gaseous and liquid components of a foamy gas liquid mixture formed in a fermentation process in a container into which a feed line for the gas liquid mixture and withdrawal lines terminate, and into whose top portion there is arranged a turbine, characterized in that the container portion below the turbine is a centrifugal separator into which the feed line terminates as a tangential inlet, and characterized in that above the orifice of the feed line, and below the turbine, there is arranged a collar extending into the inner container chamber, along the container inside wall, the collar being arranged directly above the orifice and is arranged essentially horizontally, further characterized in that the rotational axis of the turbine is essentially vertically disposed and that in the area above the orifice there is a wiper, and preferably a minimum of two wipers, arranged at the container inner wall, whereby the wiper or wipers extend into the container inner wall in the direction towards the rotational axis of the turbine, and essentially run parallel to the rotational axis, further characterized in that in the area of the container outlet for the liquid portion, there is a drag brake.

2. Device according to claim 1, characterized in that the collar has a width that is at least as wide as that of the orifice, preferably approximately twice the width of the orifice.

3. Device according to claim 1 having a cylindrical container characterized in that the ratio of cylinder height to cylinder diameter ranges between 3:1 and 6:1.

4. Device according to claim 1, characterized in that the drag brake consists of baffle plates which intersect in cross section cruciformly or radially.

5. Device according to claim 1, characterized in that the feed line terminates into the container in such a manner that the direction of rotation of the gas liquid mixture or the liquid, respectively, are the same as the direction of rotation of the turbine.

6. Device according to claim 1, characterized in that the container outlet for the liquid portion is cylindrical or initially cylindrical and subsequently conical.

7. Device for separating gaseous and liquid components of a foamy gas liquid mixture comprising;
 a cylindrical housing,
 a feed line terminating tangentially into an upper portion of the cylindrical housing,
 a collar attached to the inside of the cylindrical housing, along the circumference, directly above an orifice opening of the feed line, dividing the cylindrical housing into upper and lower chambers,
 a foam turbine on a shaft supported at the top of the cylindrical housing adjacent a gas outlet and extending into the upper chamber and being rotatable about a vertical axis,
 wiper means, disposed in the upper chamber adjacent the foam turbine and along the inner wall of the cylindrical housing, for preventing foam from rotating with the foam turbine,
 a drag brake disposed at the lower end of the lower chamber adjacent a liquid outlet, whereby the mixture is initially separated in the lower chamber by centrifugal force, separated foam rising into the upper chamber being decomposed by the foam turbine.

* * * * *